(12) United States Patent  (10) Patent No.: US 9,229,916 B2
DeLuca et al.  (45) Date of Patent: *Jan. 5, 2016

(54) RENDERING SECTIONS OF CONTENT IN A DOCUMENT

(75) Inventors: Lisa Seacat DeLuca, San Francisco, CA (US); Steven M. Miller, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 559 days.

This patent is subject to a terminal disclaimer.

(21) Appl. No.: 13/597,801

(22) Filed: Aug. 29, 2012

(65) Prior Publication Data

US 2012/0324339 A1 Dec. 20, 2012

Related U.S. Application Data

(63) Continuation of application No. 12/612,595, filed on Nov. 4, 2009, now Pat. No. 8,332,754.

(51) Int. Cl.
*G06F 17/20* (2006.01)
*G06F 17/22* (2006.01)

(52) U.S. Cl.
CPC ........ *G06F 17/2241* (2013.01); *G06F 17/2247* (2013.01)

(58) Field of Classification Search
CPC ....................................................... G06F 17/20
USPC ........................................................ 715/234
See application file for complete search history.

(56) References Cited

U.S. PATENT DOCUMENTS

| | | | |
|---|---|---|---|
| 6,111,575 A | 8/2000 | Martinez et al. | |
| 6,668,338 B1 | 12/2003 | Todd et al. | |
| 6,803,930 B1 | 10/2004 | Simonson | |
| 6,857,102 B1 | 2/2005 | Bickmore et al. | |
| 7,155,435 B1 | 12/2006 | Day et al. | |
| 7,159,172 B1 | 1/2007 | Bentley et al. | |
| 7,356,537 B2 | 4/2008 | Reynar et al. | |
| 7,788,577 B2 | 8/2010 | Lueck | |
| 7,793,216 B2 | 9/2010 | Hale et al. | |
| 7,949,943 B2 | 5/2011 | Michaud et al. | |

(Continued)

FOREIGN PATENT DOCUMENTS

WO 03096682 11/2003

OTHER PUBLICATIONS

WPF Expander Control—Cool Things Part 2 (Animation and Auto-collapsing), The Deferred Executioner: Lazy loading never looked so good, retrieved Nov. 4, 2009, <http://ewilkerson.wordpress.com/2007/02/02/wpf-expander-control-cool-things-part-2-animation-and-auto-collapsing/>.

(Continued)

*Primary Examiner* — Kavita Padmanabhan
*Assistant Examiner* — Tionna Burke
(74) *Attorney, Agent, or Firm* — Patterson & Sheridan, LLP

(57) ABSTRACT

Systems, methods and articles of manufacture are disclosed for rendering a document having collapsible sections of content. In one embodiment, the document may be received and rendered for display. Rendering the document for display may include collapsing all but a first section of the collapsible sections of content. Rendering the document for display may also include collapsing all but a second section of the collapsible sections of content, upon determining that a period of time has elapsed since collapsing all but the first section of the collapsible sections of content.

20 Claims, 6 Drawing Sheets

(56) References Cited

U.S. PATENT DOCUMENTS

| | | | |
|---|---|---|---|
| 7,966,561 B1 | 6/2011 | Nguyen et al. | |
| 7,996,790 B2 | 8/2011 | Hennum et al. | |
| 8,370,734 B2* | 2/2013 | Boone et al. | 715/234 |
| 2003/0065613 A1 | 4/2003 | Smith | |
| 2003/0172346 A1 | 9/2003 | Gould et al. | |
| 2004/0064791 A1 | 4/2004 | Hattori et al. | |
| 2004/0225958 A1 | 11/2004 | Halpert et al. | |
| 2005/0210377 A1 | 9/2005 | Schumacher et al. | |
| 2006/0036938 A1 | 2/2006 | Quaranta | |
| 2006/0127054 A1 | 6/2006 | Matsuyama | |
| 2007/0157086 A1* | 7/2007 | Drey | 715/531 |
| 2008/0005668 A1 | 1/2008 | Mavinkurve et al. | |
| 2008/0104067 A1 | 5/2008 | Thorson et al. | |
| 2008/0141145 A1 | 6/2008 | Klausmeier | |
| 2008/0294974 A1 | 11/2008 | Nurmi et al. | |
| 2009/0164885 A1 | 6/2009 | Quaranta | |
| 2010/0123928 A1 | 5/2010 | Morimoto et al. | |
| 2010/0153073 A1 | 6/2010 | Nagatsuka et al. | |
| 2011/0107197 A1 | 5/2011 | DeLuca et al. | |
| 2011/0113324 A1 | 5/2011 | DeLuca et al. | |
| 2011/0209052 A1 | 8/2011 | Parker et al. | |
| 2011/0313899 A1 | 12/2011 | Drey | |
| 2014/0250362 A1* | 9/2014 | Blas et al. | 715/234 |

OTHER PUBLICATIONS

Huss, Dave, Using the Stack Command Like a Pro, Adobe Photoshop Lightrom 2, 2009, Focal Press, Inc., Oxonia, United Kingdom.

* cited by examiner

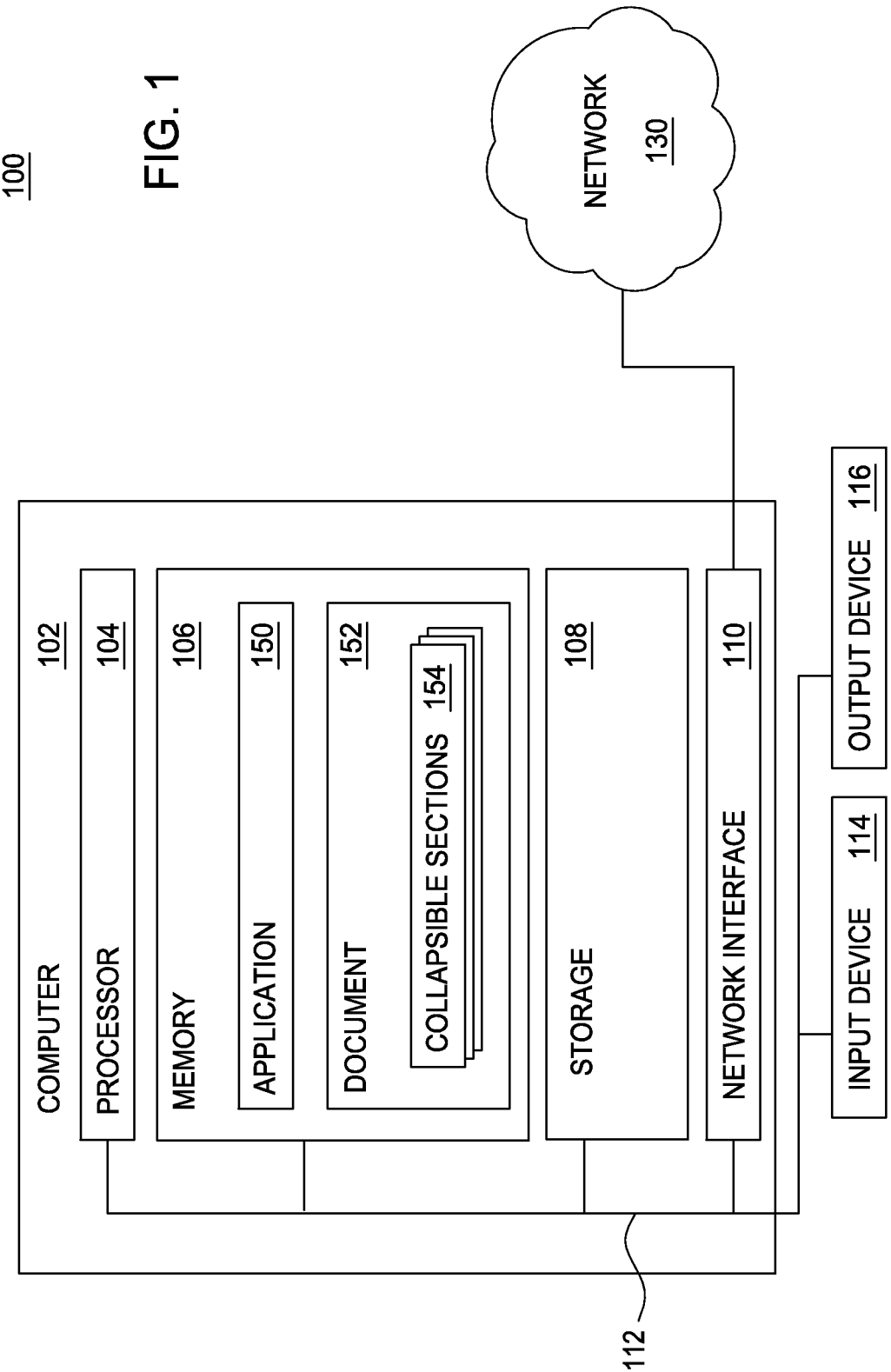

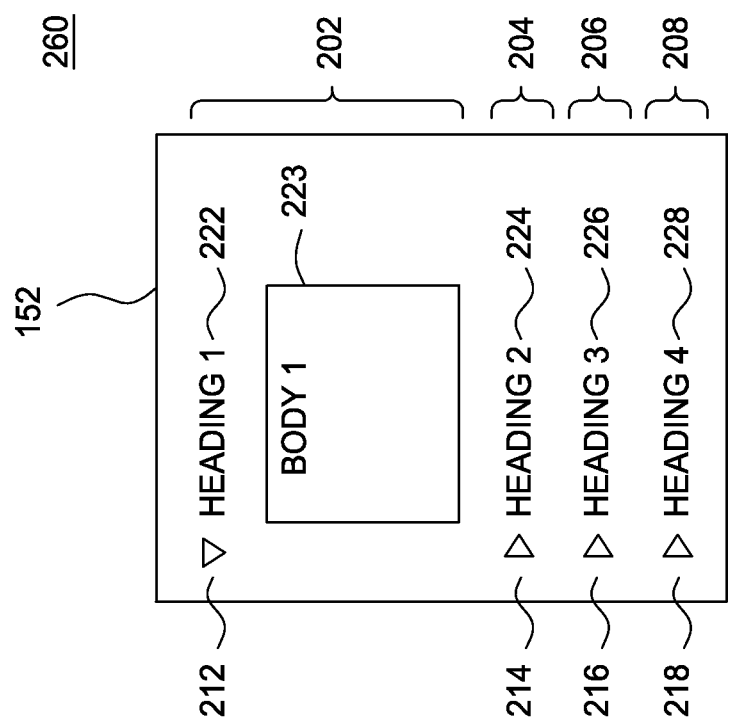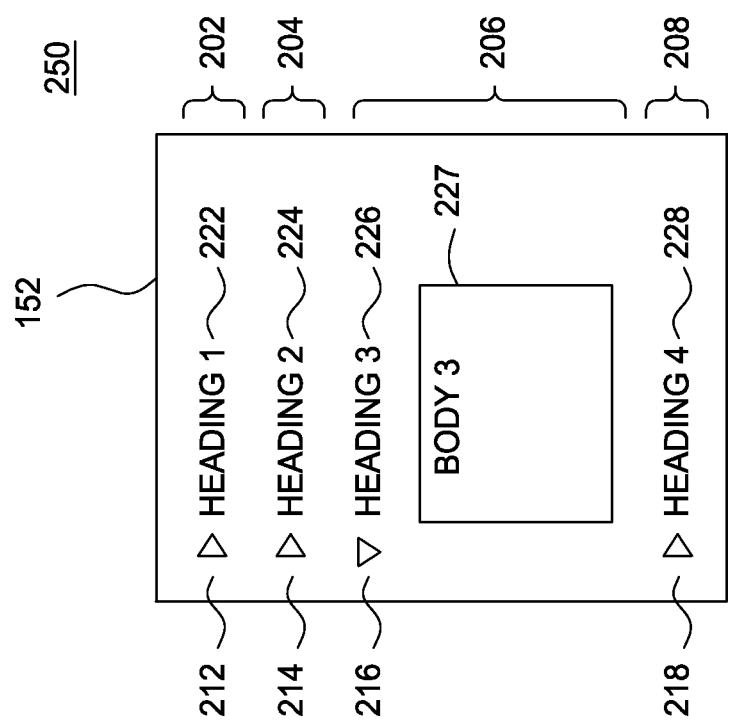

RENDERING SECTIONS OF CONTENT IN A DOCUMENT

This application is a continuation of co-pending U.S. patent application Ser. No. 12/612,595, filed Nov. 4, 2009. The aforementioned related patent application is herein incorporated by reference in its entirety.

BACKGROUND

1. Field

Embodiments of the invention relate to rendering a document for display. More specifically, embodiments of the invention relate to techniques for rendering sections of content in a document.

2. Description of the Related Art

Some e-mail and document editing applications support collapsible sections or twisties within a document. A twistie refers to a section of content within a document. Each twistie includes a twistie heading, a twistie body, and a twistie icon. The twistie heading typically includes a brief description or summary of content in the twistie body. The twistie body includes content that is collapsible and expandable via the twistie icon. For example, a user may click on the twistie icon to collapse the section of content (if the section of content is expanded) or expand the section of content (if the section of content is collapsed). The twistie heading may remain visible regardless of whether the twistie body is collapsed or expanded. Further, a document may include a twistie group. No more than one twistie of a twistie group may be expanded at any point in time. That is, if a first twistie of the twistie group is expanded, expanding a second twistie of the twistie group may also collapse the first twistie of the twistie group.

Documents often include twisties to hide optional information or to present the document to a user in a manner that reduces user confusion (e.g., resulting from a perception by the user of the document as being "cluttered"). Twisties may be used to hide detailed content in newsletters, web content, or e-mails summarizing news or items of interest. A user may expand a collapsed twistie to reveal content inside the twistie. Thus, twisties convey sections of content using less screen space (than if all of the sections of content are expanded). However, twisties may also require more user input than would expanded sections of content. For example, to reveal content inside five twisties, a user may need to click on each of the five twisties. Clicking each twistie of a document may be inconvenient to a user, particularly for large numbers of twisties or when navigating a document on a mobile telephone or other handheld device.

SUMMARY

One embodiment of the invention includes a computer-implemented method. The method may generally include configuring one or more computer processors to perform an operation. The operation may generally include receiving a document to be rendered for display, wherein the document includes a plurality of collapsible sections of content; rendering a first display of the document, wherein the first display presents a first section of content in an expanded form and each section, other than the first section in a collapsed form; and rendering at least a second display of the document, wherein the second display presents a second section of content in an expanded form and each section, other than the second section, in a collapsed form.

Another embodiment of the invention includes a computer-readable storage medium containing a program, which, when executed on a processor, performs an operation. The operation may generally include receiving a document to be rendered for display, wherein the document includes a plurality of collapsible sections of content; rendering a first display of the document, wherein the first display presents a first section of content in an expanded form and each section, other than the first section in a collapsed form; and rendering at least a second display of the document, wherein the second display presents a second section of content in an expanded form and each section, other than the second section, in a collapsed form.

Still another embodiment includes a system having one or more computer processors and a memory containing a program, which when executed by the one or more computer processors is configured to perform an operation. The operation may generally include receiving a document to be rendered for display, wherein the document includes a plurality of collapsible sections of content; rendering a first display of the document, wherein the first display presents a first section of content in an expanded form and each section, other than the first section in a collapsed form; and rendering at least a second display of the document, wherein the second display presents a second section of content in an expanded form and each section, other than the second section, in a collapsed form.

BRIEF DESCRIPTION OF THE SEVERAL VIEWS OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 1 is a block diagram illustrating a system 100 for rendering a document for display, according to one embodiment of the invention.

FIGS. 2A-2B illustrate graphical user interface (GUI) screens of an application for rendering the document for display, according to one embodiment of the invention.

DETAILED DESCRIPTION OF THE PREFERRED EMBODIMENTS

Figure 3A:
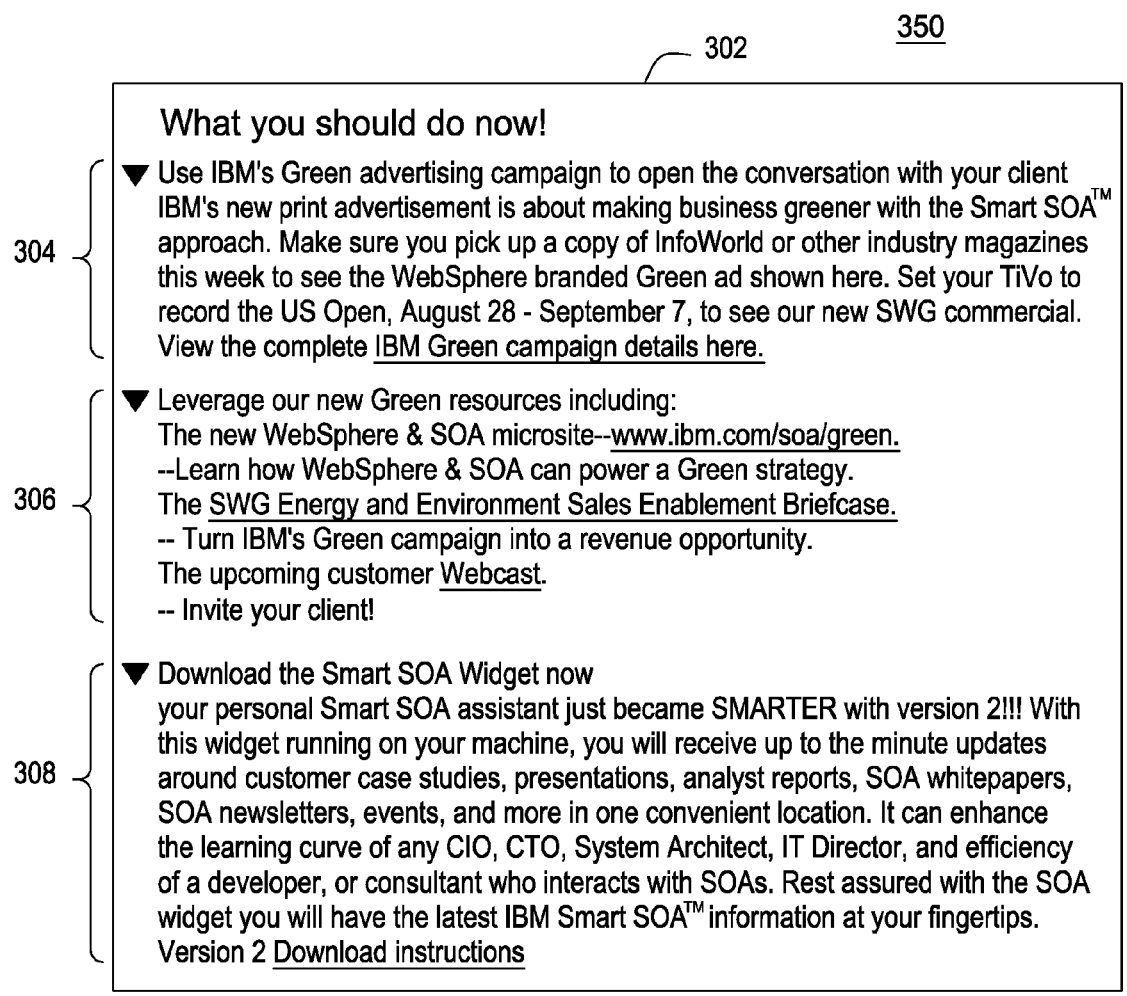
FIGS. 3A-3B illustrate GUI screens of the application, according to one embodiment of the invention.

Embodiments of the invention provide techniques for rendering a document for display. One embodiment of the invention provides an application for rendering the document for display. The document may include collapsible sections of content. Examples of documents include web pages, word processing documents, e-mail, etc. The application may be a Web browser, a word processor, an e-mail reader, etc. In one embodiment, the application may receive the document to be rendered for display. The application may render the document for display. Rendering the document for display may include collapsing all but a first section of the collapsible sections of content (i.e., collapsing all but one twistie). Subsequently, after a specified time period, the first section is collapsed and a second section is expanded. This process may be repeated as needed to allow the application to cycle through the collapsible sections of content in a document (i.e., expanding each of the sections, one section at a time). Consequently, a user may view content in the collapsible sections in the document without having to provide any user input (e.g., for expanding any particular section). Further, the user may customize how the application cycles through the collapsible sections of content. For example, the user may pause the cycling and/or adjust the period of time to elapse between two sections of content. Accordingly, content of an amount too great to be displayed all at once to a user (due to constraints of screen display size and/or risk confusing the user) may be conveyed more efficiently and/or conveniently for the user.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a block diagram illustrating a system 100 for rendering a document for display, according to one embodiment of the invention. The system 100 includes a computer 102. The computer 102 may be connected to other computers via a network 130. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system (not shown). Examples of operating systems include UNIX, versions of the Microsoft Windows® operating system, and distributions of the Linux® operating system. (Note: Linux is at trademark of Linus Torvalds in the United States and other countries.) More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single entity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers via the network 130.

The storage 108 may be a hard disk drive storage device. Although the storage 108 is shown as a single unit, the storage 108 may be a combination of fixed and/or removable storage devices, such as fixed disc drives, floppy disc drives, tape drives, removable memory cards, or optical storage. The memory 106 and the storage 108 may be part of one virtual address space spanning multiple primary and secondary storage devices.

The input device 114 may be any device for providing input to the computer 102. For example, a keyboard, keypad, light pen, touch-screen, track-ball, or speech recognition unit, audio/video player, and the like may be used. The output device 116 may be any device for providing output to a user of the computer 102. For example, the output device 116 may be any conventional display screen or set of speakers, along with their respective interface cards, i.e., video cards and sound cards. Although shown separately from the input device 114, the output device 116 and input device 114 may be combined. For example, a display screen with an integrated touch-screen, a display with an integrated keyboard, or a speech recognition unit combined with a text speech converter may be used.

As shown, the memory 106 of the computer 102 includes an application 150 and a document 152. The document includes collapsible sections 154. As described above, the application 150 may be a Web browser, a word processor, an e-mail reader, etc. In one embodiment, each collapsible section 154 may be a twistie. As described above, a twistie refers to a section of content within a document that includes a twistie heading, a twistie body, and a twistie icon. The twistie heading may include a brief description or summary of content in the twistie body. The twistie body may include content that is collapsible and expandable via the twistie icon. As described below, the application 150 may sequentially present one expanded twistie at a time.

FIGS. 2A-2B illustrate graphical user interface (GUI) screens 250, 260 of the application 150 of FIG. 1, according to one embodiment of the invention. The GUI screen 250 of FIG. 2A includes the document 152. The document 152 includes a twistie group. The twistie group includes twisties 202, 204, 206, 208. Each twistie includes a twistie heading, a twistie body, and a twistie icon. However, no more than one twistie body in the twistie group is expanded (e.g., visible) at any point in time. For example, the twistie 206 includes a twistie heading 226 ("Heading 3"), an expanded twistie body 227, and a twistie icon 216. The twistie 202 includes a twistie heading 222 ("Heading 1"), a collapsed twistie body (not visible in the document 152), and a twistie icon 212. Similarly, the twistie 204 includes a twistie heading 224 ("Heading 2"), a collapsed twistie body (not visible in the document 152), and a twistie icon 214. Further, the twistie 208 includes a twistie heading 228 ("Heading 4"), a collapsed twistie body (not visible in the document 152), and a twistie icon 218.

In one embodiment, a user may click on a twistie icon to expand/collapse a twistie body associated with the twistie icon. For example, suppose the user clicks on the twistie icon 212. In response, the application may re-render the document 152 to generate a GUI screen 260 illustrated in FIG. 2B. As shown, the GUI screen 260 includes the document 152. The document 152 includes the twistie group. The twistie group includes the twisties 202, 204, 206, 208. Upon detecting the user clicking on the twistie icon 212, the application 150 expands the associated twistie body 223. Further, the application 150 collapses the previously-expanded twistie body 227 (of FIG. 2A), because the twisties 202, 204, 206, 208 are part of a single twistie group in the document 152.

While embodiments are described herein with reference to the application 150 rendering a document in accordance with a twisties and/or twistie groups specified in the document, other embodiments are broadly contemplated without departing from the scope of the invention. For example, in one embodiment, the application 150 receives a document that does not include any twisties or twistie groups. The application 150 may parse the document to generate a twistie and/or a twistie group. For example, the application 150 may segment the document into sections based on a layout of the document (e.g., specific tags in an HTML page, such as <h1>, <div>, etc.). The application 150 may then generate a twistie for each section of the document. In one embodiment, the application 150 may also disregard or replace any twistie group included in the document. Of course, those skilled in the art will recognize that the way of generating a twistie and/or twistie group from a document may be tailored to suit the needs of a particular case.

For example, suppose the document includes the following Hypertext Markup Language (HTML)-formatted text:

TABLE I

Document text example

```
<ol>
    <li>Coffee</li>
    <li>Tea</li>
    <li>Milk</li>
</ol>
<ol>
    <li>Apple</li>
    <li>Orange</li>
    <li>Banana</li>
</ol>
```

In this particular example, the application 150 may generate a single twistie for each <ol> (ordered list) tag in the text. The user may click on a twistie icon of the single twistie to expand and/or collapse a twistie body (i.e., the corresponding ordered list) of the twistie. The application 150 may cycle through each twistie. For example, the application 150 may expand only the twistie for Coffee, Tea, and Milk. Subsequently, the application 150 may expand only the twistie for Apple, Orange, and Banana. As another example, suppose the clipboard includes the following HTML-formatted text:

TABLE II

Document text example

```
<ol>
    <li>Coffee - Coffee continues to be one of the most popular drinks
    in the United States . . . .</li>
    <li>Tea - Tea drinking has been embraced by many as a healthy
    . . . .</li>
    <li>Milk - Milk has long been a staple of an American breakfast,
    especially for young children . . . .</li>
</ol>
```

In this particular example, the application 150 may generate a twistie for each <li> (list item) tag in the text. For example, the application 150 may generate twisties corresponding to Coffee, Tea, and Milk, respectively. The user may click on a twistie icon of one of the twisties to expand a corresponding twistie body (e.g., "Coffee continues to be one of the most popular drinks in the United States . . . ."). The application 150 may expand only the twistie for Coffee. Subsequently, the application 150 may expand only the twistie for Tea, and so on.

Unlike the previous example in which the entire ordered list may be expanded or collapsed, individual items in the list may be expanded or collapsed (and cycled through) in this example. For instance, the application 150 may determine if an average number of words per <li> tag in an ordered list exceeds a predefined threshold. If so, the application 150 may generate a twistie for each <li> tag. Otherwise, there may not be a sufficient number of words for which to warrant generating a twistie for each <li> tag. Thus, the application 150 may generate a single twistie for each ordered list overall. In one embodiment, in the case of HTML markup like the examples of Table I and II, a twistie may be defined using cascading style sheets (CSS) to provide twistie like behavior. For example, where a following div may initially be hidden (style="display:none") and when a click action is taken the style changes to display="inline"

Figure 3B:
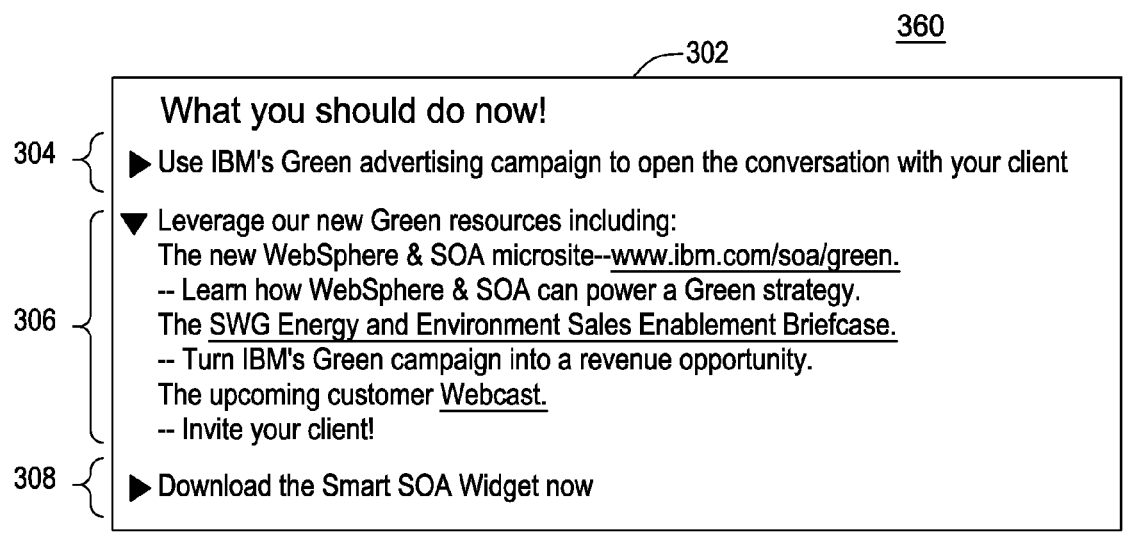

FIGS. 3A-3B illustrate GUI screens 350, 360 of the application 150 of FIG. 1, according to one embodiment of the invention. The GUI screen 350 of FIG. 3A includes a document 302. As shown, the document 302 includes twisties 304, 306, 308. In one embodiment, the application 150 may sequentially expand only one of the twisties 304, 306, 308 at a time. For example, the application 150 may expand the first twistie 304, followed by the second twistie 306, followed by the third twistie 308. Further, the application 150 may expand each twistie after a period of time has elapsed since expanding a previous twistie. Once the last twistie is expanded, the application 150 may loop back to expand the first twistie 304. For example, the GUI screen 360 of FIG. 3B illustrates the document 302 having an expanded twistie 306. The document 302 also includes collapsed twisties 304, 308. Upon determining that a period of time has elapsed since expanding the twistie 306, the application 150 may collapse the twistie 306 and expand the twistie 308.

In one embodiment, the user may customize how the application 150 cycles through twisties of a document. For example, the user may adjust the time period that is to elapse between expanding two twisties of the document. In one embodiment, the application 150 may specify select a time periods for each twistie. For example, the application 150 may increase the time period for a twistie with a larger number of words than others. That is, a twistie that includes a greater amount of content may be expanded for a longer period of time in the cycle to allow the greater amount of content to be conveyed to the user.

Further, the application 150 may also pause, stop, and/or resume the cycle based on user input. For example, the application 150 may output icons on the page. The icons represent commands to pause, stop, and/or resume the cycle, respectively. A user may click on an icon to issue a corresponding command to the application 150. Further, the application 150 may also output an icon representing a state of the cycle (i.e., whether the cycle is active, paused, etc.). Further still, the icons representing commands for the cycle and the icon representing a state of the cycle may be combined, according to one embodiment.

Figure 4A:
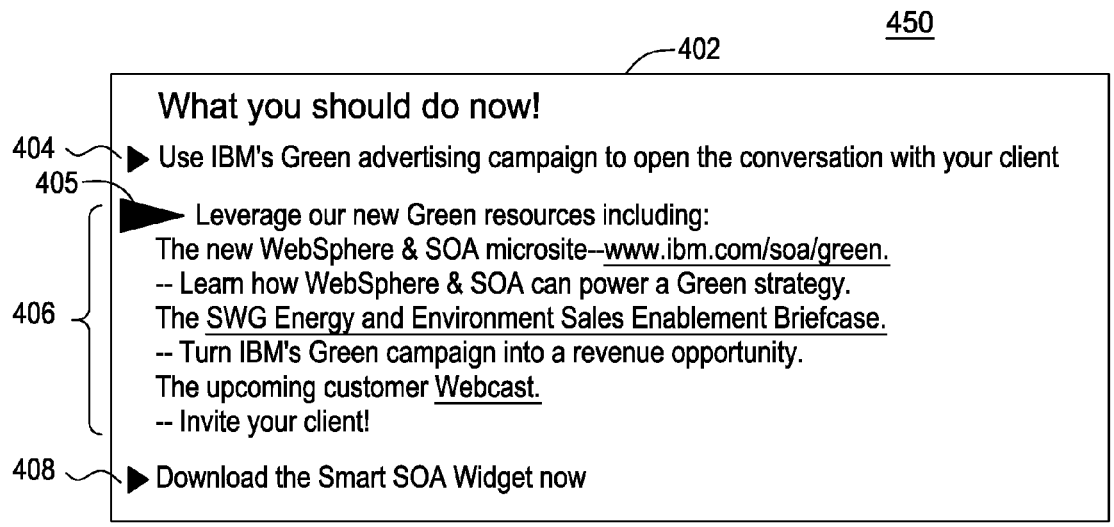
FIGS. 4A-4B illustrate GUI screens of the application, according to one embodiment of the invention.
Figure 4B:
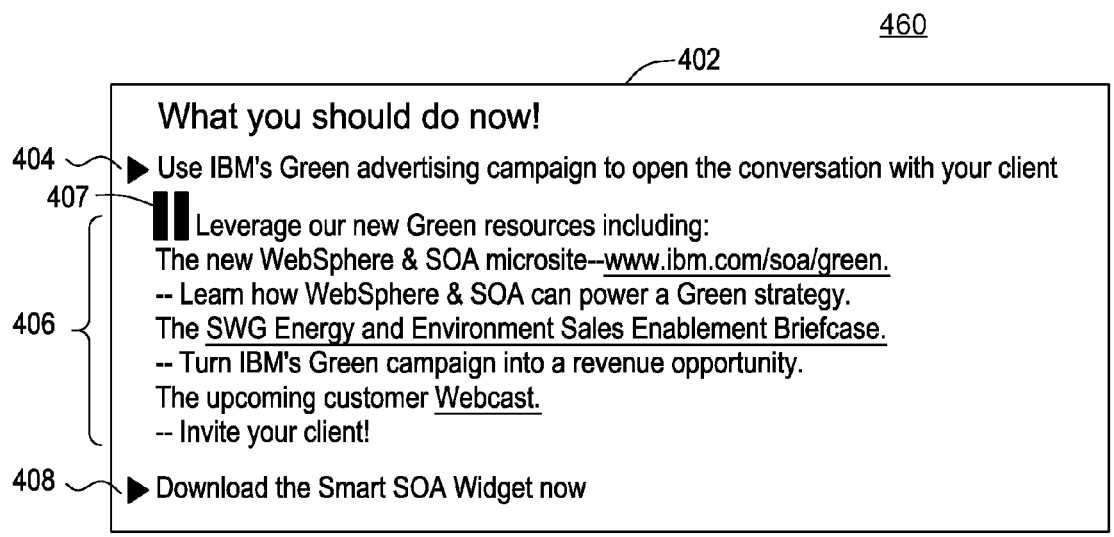

FIGS. 4A-4B illustrate GUI screens 450, 460 of the application 150 of FIG. 1, according to one embodiment of the invention. As shown, the GUI screen 450 of FIG. 4A includes a document 402. The document 402 includes collapsed twisties 404, 408 and an expanded twistie 406. Further, the GUI screen 450 includes an icon 405 representing a state of the cycle. As shown, the icon 405 is a right-facing triangle that represents that the cycle is currently active.

Suppose the user clicks on the icon 405. In response, the application 150 may pause the cycle and generate the GUI screen 460 of FIG. 4B, according to one embodiment. As shown, the GUI screen 460 includes the document 402. The document 402 includes the collapsed twisties 404, 408 and the expanded twistie 406. Further, the GUI screen 450 includes an icon 407 representing a state of the cycle. As shown, the icon 407 is two vertical bars that represent that the cycle is currently paused. Of course, those skilled in the art will recognize that the way of conveying a current state of the cycle to a user and/or conveying commands for the cycle to a user may be tailored to suit the needs of a particular case. For example, in one embodiment, a user may configure keystrokes for cycling to a next, previous, first, or last twistie in the cycle.

Figure 5:
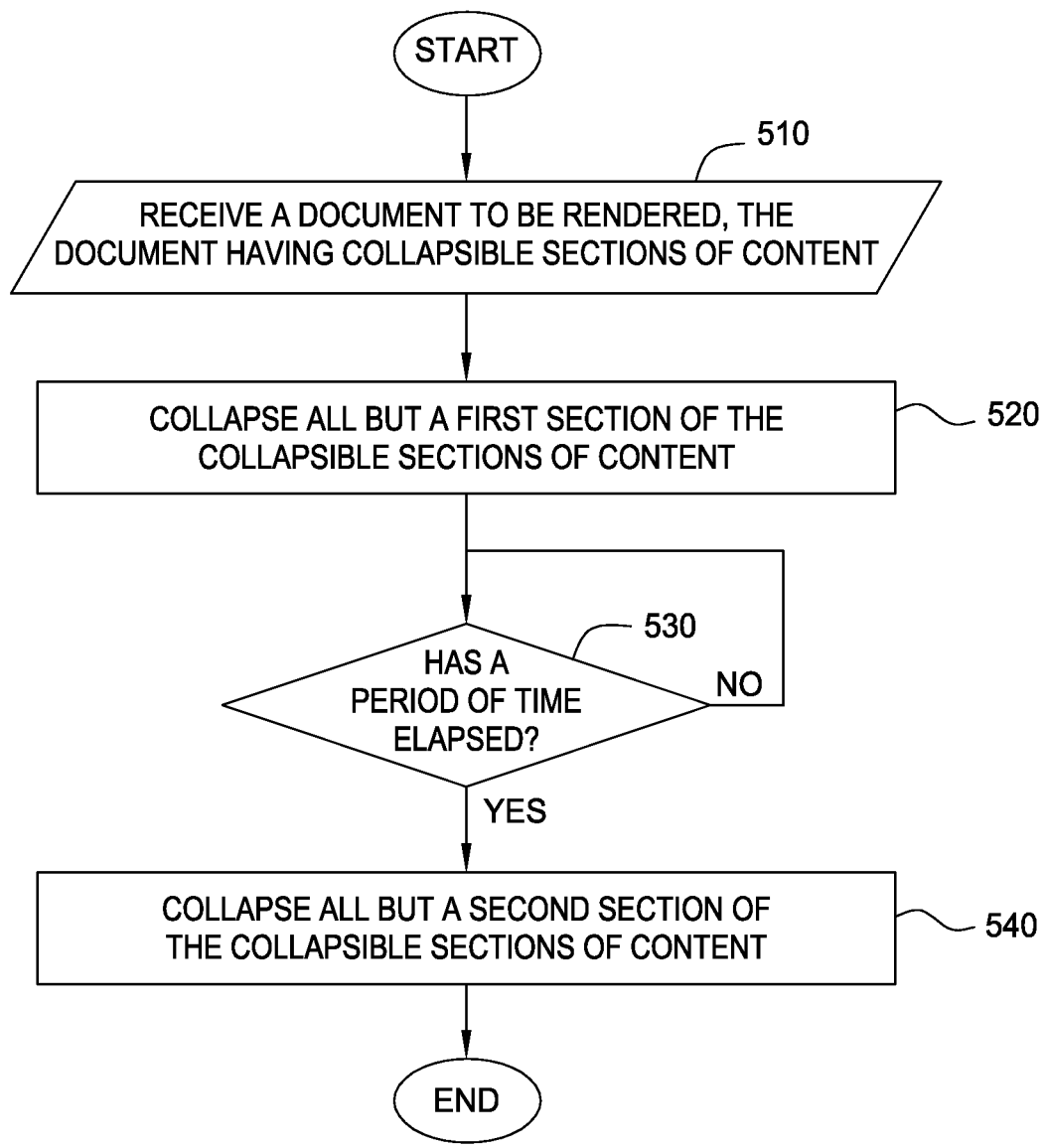
FIG. 5 is a flowchart depicting a method for rendering a document for display, according to one embodiment of the invention.

FIG. 5 is a flowchart depicting a method 500 for rendering the document 152 for display, according to one embodiment of the invention. As shown, the method 500 begins at step 510, where the application 150 receives the document 152 to be rendered. The document 152 may include collapsible sections 154 of content. Alternatively, the application 150 may evaluate the content and generate group of collapsible sections (e.g., for text, each paragraph). At step 520, the application 150 may collapse all but a first section of the collapsible sections 154 of content. At step 530, the application 150 may determine whether a period of time has elapsed. Upon determining that a period of time has elapsed, the application 150 collapses all but a second section of the collapsible sections 154 of content (step 540). If there are more than two collapsible sections, the application 150 may repeat step 540 for each of the remaining collapsible sections. After the step 540, the method 500 terminates.

More generally, the application 150 may sequentially render multiple displays of the document, according to one embodiment of the invention. For example, the application 150 may render a first display of the document. The first display may present a first collapsible section in an expanded form and each other section (i.e., other than the first collapsible section) in a collapsed form. Once a period of time has elapsed since rendering the first display of the document, the application 150 may render a second display of the document. The second display may present a second collapsible section in an expanded form and each other section (i.e., other than the second collapsible section) in a collapsed form. Further, the application 150 may generate additional displays for any remaining collapsible sections. Further still, a user may customize the period of time to elapse between rendering each display of the document.

Figure 6:
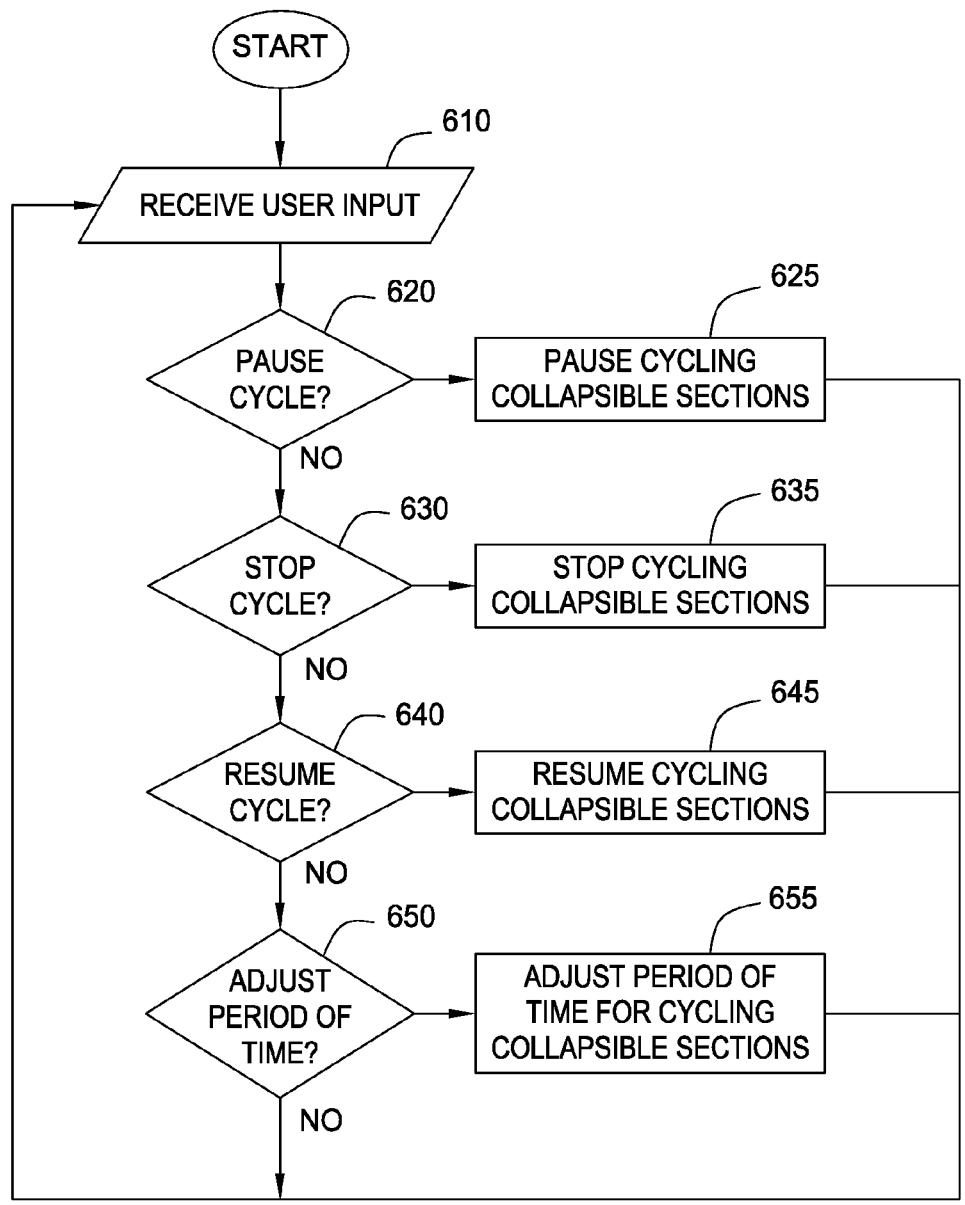
FIG. 6 is a flowchart depicting a method for customizing how the application cycles through collapsible sections of a document, according to one embodiment of the invention.

FIG. 6 is a flowchart depicting a method 600 for customizing how the application 150 cycles through collapsible sections 154 of the document 152, according to one embodiment of the invention. As shown, the method 600 begins at step 610, where the application 150 receives input from a user.

If the input specifies to pause the cycle (step 620), the application 150 pauses cycling through the collapsible sections 154 of the document 152 (step 625). If the input specifies to stop the cycle (step 630), the application 150 stops cycling through the collapsible sections 154 of the document 152 (step 635). If the input specifies to resume the cycle (step 640), the application 150 resumes cycling the collapsible sections 154 of the document 152 (step 645). In one embodiment, resuming from a stopped cycle expands a first section of the document (e.g., a topmost section of the document), thus restarting the cycle. In contrast, resuming a paused cycle continues the cycle from the section at which the cycle was paused. If the input specifies to adjust the period of time (step 650), the application 150 adjusts the period of time for cycling the collapsible sections 154 of the document 152 (step 655). The method 600 may then loop back to the step 610 to process a next input from the user.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Advantageously, embodiments of the invention provide techniques for rendering collapsible sections of a document. One embodiment of the invention provides an application for rendering documents. In one embodiment, the application receives a document to be rendered for display. The document may include collapsible sections. The application may render the document for display. Rendering the document for display may include collapsing all but a first section of the collapsible sections of the document. Rendering the document for display may also include collapsing all but a second section of the collapsible sections of content in the document, upon determining that a period of time has elapsed since collapsing all but the first section of the collapsible sections of content in the document. Consequently, a user may view content in the collapsible sections in the document without having to navigate among the collapsible sections. Further, the user may customize how the application cycles through the collapsible sections. For example, the user may pause a cycle or adjust the period of time to elapse between two sections of content. Accordingly, content of an amount too great to be displayed all at once to a user (due to constraints of screen display size and/or risk of confusing the user) may be conveyed more efficiently and/or conveniently for the user.

While the foregoing is directed to embodiments of the present invention, other and further embodiments of the invention may be devised without departing from the basic scope thereof, and the scope thereof is determined by the claims that follow.

What is claimed is:

1. A computer-implemented method to render collapsible sections of documents without requiring user intervention, the computer-implemented method comprising:
   receiving a document to be rendered for display;
   analyzing the document by operation of one or more computer processors in order to designate a plurality of collapsible sections of content in the document, without requiring user input explicitly specifying any content as being collapsible, wherein the document does not explicitly specify any content as being collapsible; and
   cycling through expanding the plurality of collapsible sections of content one by one without requiring user intervention and without having more than a single collapsible section of content expanded at a time, comprising:
      rendering a first display of the document, wherein the first display presents a first section of content in an expanded form and each section, other than the first section, in a collapsed form; and
      rendering at least a second display of the document, wherein the second display presents a second section of content in an expanded form and each section, other than the second section, in a collapsed form.

2. The computer-implemented method of claim 1, wherein the second display of the document is rendered upon determining that a period of time has elapsed since rendering the first display of the document.

3. The computer-implemented method of claim 1, further comprising:
   receiving user input specifying the period of time to elapse between rendering each display of the document.

4. The computer-implemented method of claim 1, further comprising:
   stopping cycling of the plurality of collapsible sections of content in the document in response to user input.

5. The computer-implemented method of claim 1, wherein the operation further comprises:
   pausing cycling of the plurality of collapsible sections of content in the document in response to user input.

6. A non-transitory computer-readable storage medium containing a program which, when executed, performs an operation to render collapsible sections of documents without requiring user intervention, the operation comprising:
   receiving a document to be rendered for display,
   analyzing the document by operation of one or more computer processors when executing the program and in order to designate a plurality of collapsible sections of content in the document, without requiring user input explicitly specifying any content as being collapsible, wherein the document does not explicitly specify any content as being collapsible; and
   cycling through expanding the plurality of collapsible sections of content one by one without requiring user intervention and without having more than a single collapsible section of content expanded at a time, comprising:
      rendering a first display of the document, wherein the first display presents a first section of content in an expanded form and each section, other than the first section in a collapsed form; and rendering at least a second display of the document, wherein the second display presents a second section of content in an expanded form and each section, other than the second section, in a collapsed form.

7. The non-transitory computer-readable storage medium of claim 6, wherein the second display of the document is rendered upon determining that a period of time has elapsed since rendering the first display of the document.

8. The non-transitory computer-readable storage medium of claim 6, wherein the operation further comprises:
receiving user input specifying the period of time to elapse between rendering each display of the document.

9. The non-transitory computer-readable storage medium of claim 6, wherein the operation further comprises:
stopping cycling of the plurality of collapsible sections of content in the document in response to user input.

10. The non-transitory computer-readable storage medium of claim 6, wherein the operation further comprises:
pausing cycling of the plurality of collapsible sections of content in the document in response to user input.

11. A system to render collapsible sections of documents without requiring user intervention, the system comprising:
one or more computer processors; and
a memory containing a program, which when executed by the one or more computer processors is configured to perform an operation comprising:
receiving a document to be rendered for display;
analyzing the document in order to designate a plurality of collapsible sections of content in the document, without requiring user input explicitly specifying any content as being collapsible, wherein the document does not explicitly specify any content as being collapsible; and
cycling through expanding the plurality of collapsible sections of content one by one without requiring user intervention and without having more than a single collapsible section of content expanded at a time, comprising:
rendering a first display of the document, wherein the first display presents a first section of content in an expanded form and each section, other than the first section in a collapsed form; and
rendering at least a second display of the document, wherein the second display presents a second section of content in an expanded form and each section, other than the second section, in a collapsed form.

12. The system of claim 11, wherein the second display of the document is rendered upon determining that a period of time has elapsed since rendering the first display of the document.

13. The system of claim 11, wherein the operation further comprises:
receiving user input specifying the period of time to elapse between rendering each display of the document.

14. The system of claim 11, wherein the operation further comprises:
stopping cycling of the plurality of collapsible sections of content in the document in response to user input.

15. The system of claim 11, wherein the operation further comprises:
pausing cycling of the plurality of collapsible sections of content in the document in response to user input.

16. The system of claim 15, wherein the operation further comprises:
resuming cycling of the plurality of collapsible sections of content in the document in response to user input.

17. The system of claim 16, wherein the expanding of the plurality of collapsible sections is cycled through without requiring user input explicitly specifying to cycle through expanding the plurality of collapsible sections, wherein the document does not explicitly specify to cycle through expanding the plurality of collapsible sections, wherein each of the plurality of collapsible sections of content is a twistie, wherein each twistie includes a twistie header, a twistie body, and a twistie icon for collapsing and expanding the twistie body.

18. The system of claim 17, wherein after the first display is output, the second display is output without requiring user intervention; wherein analyzing the document comprises:
automatically generating the twistie for each of the plurality of collapsible sections of content, based on parsing the document.

19. The system of claim 18, wherein the document is composed in a markup language, wherein the operation further comprises:
automatically generating a plurality of twistie groups for the plurality of collapsible sections of content, each twistie group containing a respective one or more twisties, by segmenting the document into sections based on a layout of the document as indicated by predefined tags in the markup language, wherein no more than a single collapsible section of content per twisty group is expanded at a time.

20. The system of claim 19, wherein the second display of the document is rendered upon determining that a period of time has elapsed since rendering the first display of the document, wherein the markup language is HyperText Markup Language (HTML), wherein the document comprises an HTML document, wherein the operation further comprises:
receiving user input specifying the period of time to elapse between rendering each display of the document; and
stopping cycling of the plurality of collapsible sections of content in the document in response to user input.

* * * * *